United States Patent
Perry

[15] 3,656,280
[45] Apr. 18, 1972

[54] ABSORPTION UNIT
[72] Inventor: Robert Bruce Perry, Lawrence, Kans.
[73] Assignee: E. I. du Pont de Nemours and Company, Wilmington, Del.
[22] Filed: Aug. 27, 1968
[21] Appl. No.: 755,681

[52] U.S. Cl.................................55/240, 261/113, 55/257, 261/111
[51] Int. Cl..........................................B01d 47/00
[58] Field of Search.................55/240, 257; 261/113, 114, 261/114 JP, 114 VT, 126, 98, 103, 106

[56] References Cited

UNITED STATES PATENTS

| | | | |
|---|---|---|---|
| 1,738,543 | 12/1929 | Travers | 261/113 X |
| 2,747,849 | 5/1956 | Colburn et al. | 55/240 X |
| 3,036,417 | 5/1962 | Mare et al. | 55/257 X |
| 3,095,462 | 6/1963 | Pomper | 261/113 |
| 522,989 | 7/1894 | King | 261/106 |
| 3,266,224 | 8/1966 | Ferretti | 55/241 |

FOREIGN PATENTS OR APPLICATIONS

| | | | |
|---|---|---|---|
| 877,263 | 9/1961 | Great Britain | 55/240 |

Primary Examiner—Tim R. Miles
Assistant Examiner—Steven H. Markowitz
Attorney—Donald W. Huntley

[57] ABSTRACT

An absorption unit for the purification of gases having an improved absorption plate.

1 Claim, 3 Drawing Figures

INVENTOR
ROBERT B. PERRY

BY Donald W. [signature]

ATTORNEY

ABSORPTION UNIT

BACKGROUND OF THE INVENTION

In many manufacturing processes, it is necessary to purify various gaseous streams by removal of vaporized or suspended components. It is desirable, either for reclamation or pollution abatement, to avoid having these components escape into the atmosphere from a particular exhaust stream. A widely used method of purification consists of "scrubbing" the particular stream of gases with a liquid. The purifying liquid usually is brought into intimate contact with the gas by distributing the liquid onto an absorption medium. The absorption medium is positioned in the stream of gases so that the gases must pass through the absorption medium to obtain the broadest possible gas-liquid interface. Often a series of two or more such spray-absorption medium arrangements are employed at various points along the gas stream to effect the most complete removal of the desired component from the gas.

The absorption media previously used in this type of absorption unit have operated on the principle of forcing the gas stream into a circuitous, convoluted path through the absorption plate. The absorption plate, being thoroughly wetted with the absorption liquid, would cause a severe turbulence in the gas stream, which turbulence resulted in a mixture of the absorption liquid and exhaust gas. Such units are typified by the gas scrubbers of the Peabody Engineering Corporation in which the absorption plate comprises a metal plate having apertures formed therein, stationary baffles being positioned immediately downstream from each aperture, so that the gaseous stream is forced around baffles immediately after passing through the apertures. Another type of absorption medium, commercially available from Multi-metal Wire Cloth Inc. is described in U.S. Pat. No. 3,052,360. That absorption plate comprises a pair of metal sheets, each sheet having a multiplicity of holes therein juxtaposed so that a hole in one sheet is immediately opposite a larger unperforated area of the other sheet.

It can be readily appreciated that this type of absorption medium, while providing an adequate dispersion of the absorption liquid, has several drawbacks. These plates tend to become clogged, they substantially impede the flow of the exhaust gases, and are difficult and costly to manufacture.

SUMMARY OF THE INVENTION

The instant invention provides an absorption unit having an absorption medium which is relatively simple to manufacture, provides intimate contact between gas and absorption liquid, and at the same time is substantially nonclogging, easy to clean and results in minimum impedance of the gas flow.

Specifically the instant invention provides an improved absorption unit for purifying a stream of gases of the type comprising a housing having a passage therethrough, at least one absorption medium positioned within the passage, and means for distributing an absorption liquid on the absorption medium, the improvement which comprises an absorption medium consisting of a single plate having a plurality of apertures formed therein.

DESCRIPTION OF THE PREFERRED EMBODIMENTS

The absorption plates of the instant invention, in operation, become coated with absorption liquid. The instant invention rests on the discovery that the passage of the gas through the apertures in the absorption plates results in the formation of bubbles from the liquid on the periphery of the apertures in the plate, which bubbles maximize the gas liquid interface and result in a degree of absorption from the gas which can be equal to or greater than absorption media requiring a circuitous path of the gas through an absorption medium.

The particular materials used for the formation of the absorption plates used in the instant invention is not a critical aspect of the invention. The only requirement is that the plate be sufficiently rigid to withstand the pressure of the gas flow without substantial deformation. The particular materials used would therefore vary according to the chemical composition and temperatures of the gas to be treated. Generally, for the longest possible life for the absorption plate, a plate of a metal such as copper, tin, bronze, or steel is desirable. For the greatest flexibility in the use of the absorption units of the instant invention, absorption plates of stainless steel are especially preferred.

Figure 1:
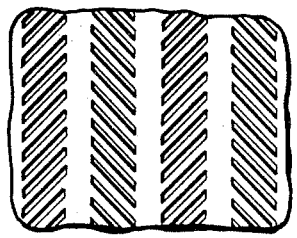
FIGS. 1 and 2 illustrate two particular absorption plates which can be used in the instant invention.
Figure 2:
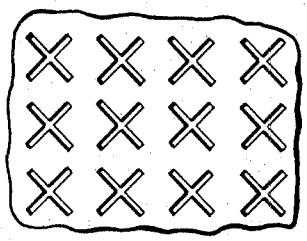

The efficiency of the absorption plates used in the instant invention increases directly with the number and inversely with the size of the apertures formed in the plate. While not intending to be restricted to any particular theory of operation, it is believed that the absorption plates used in the instant invention operate by increasing the speed of the gas flow through the apertures in the absorption plates, thus increasing the tendency of the gas to form bubbles from the absorption liquid deposited on the periphery of the apertures formed in the plate. It is therefore desirable to provide a large number of apertures in the absorption plate, each having a minimum size combined with a large perimeter. It has been found especially effective to provide the apertures in a slit-like configuration, each slit preferably having a maximum width of about 0.012 inch. Such an absorption plate is illustrated, for example, in FIG. 1, where the slits are arranged in a herringbone configuration, each slit being about one-half inch long. Additional geometric configurations for the apertures in the absorption plates used in the instant invention include circular and oval configurations, and cross-like configurations as illustrated in FIG. 2. Absorption plates having a relatively high perimeter for the aperture combined with a relatively low minimum dimension of the geometric configuration of the aperture, maximize the air speed at the point of passage through the absorption plate and thereby increase the formation of bubbles.

The positioning of the absorption plates of the instant invention within the air passage through the absorption unit will vary according to the particular path that the gases take through the absorption unit and the method by which the absorption liquid is collected and removed. For example, in absorption units so designed that the gases flow through the unit in a substantially vertical direction, the absorption plate is most effectively placed across the passage at a 90° angle with respect to the flow of gases through the passage, so as to provide most direct contact with the stream of gases. In absorption units of this type, the absorption liquid is generally collected in a sump formed in the housing of the absorption unit at the bottom of the housing. In that type of absorption unit having a substantially horizontal flow of gases, the absorption liquid is most commonly collected in a sump formed in the housing of the absorption unit which is positioned directly below the absorption plates. In this type of unit, to facilitate the recollection of the absorption fluid, it has been found most effective to position the absorption plates at an angle of about 45° with respect to the flow of gases through the absorption unit.

The particular means used for distributing the absorption liquid onto the absorption medium will vary somewhat according to the size and position of the absorption plate. The only critical requirement is that the absorption plate be completely covered with the absorption liquid, and in particular, the periphery of the apertures formed in the plate. In relatively small absorption plates, the absorption liquid can simply be flowed over the area of the plates. In plates having a larger surface area, however, it has been found most convenient to supply the absorption liquid by spraying the liquid onto the absorption plates through banks of sprayheads positioned upstream from the absorption plate, thus insuring a uniform distribution of the absorption liquid over the entire surface of the plate.

In absorption units of this type, it is found that a mist of absorption liquid may be formed by the passing exhaust gases, which may become suspended in the exhaust stream. To prevent the escape of any large quantity of absorption liquid and impurities suspended in this liquid, it is preferred that a louvered entrainment separator of the type generally used in this type of absorption unit be provided downstream from the absorption plate so as to entrap any absorption liquid which may have become suspended in the exhaust stream.

Figure 3:
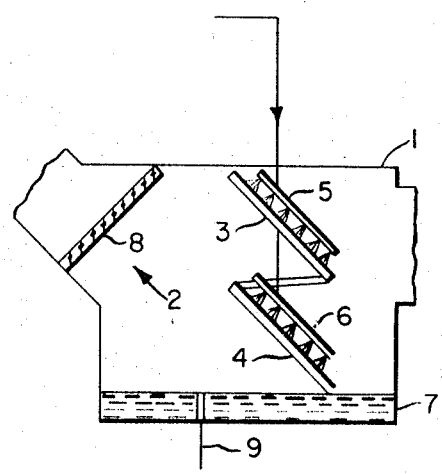
FIG. 3 is a schematic representation of an absorption unit of the instant invention.

The instant invention will be more clearly understood by reference to FIG. 3, which schematically illustrates a particular embodiment of the instant invention. In that figure, 1 represents the housing of the absorption unit, and 2 illustrates the passage through the absorption unit. Two absorption plates, 3 and 4 are positioned at an angle of about 45° with respect to the flow of gases through the unit. Absorption liquid is supplied through spray banks 5 and 6, which impinge upon the absorption plates and completely coat the plates with the absorption liquid. The absorption liquid is collected in a sump 7 formed in the bottom of the absorption unit, with the aid of an entrainment separator 8 positioned downstream from the absorption plates. The absorption liquid is removed from the sump through outlet 9. The absorption liquid can be either recycled through the sprayheads, discarded, or reused in other operations.

The absorption units of the instant invention can be used in a wide variety of industrial operations, for the general purposes of product recovery, gas purification, and control of atmospheric pollution. Products which can be recovered from gaseous exhaust streams include, for example, soda ash, iron oxide, limestone, carbon black, ammonium phosphate, ammonium sulphate, and precious metals. These units, by use of appropriate absorption liquids, can remove gaseous components from an exhaust stream such as $SO_2$, $CO_2$, $H_2S$, HCN, and $NO_2$. These particular units have been found especially suitable for use in the recovery of vaporized softener in the processing of regenerated cellulose films, as described in detail in U.S. Pat. No. 3,538,613.

I claim:

1. In an absorption unit for purifying a stream of gas comprising a housing having a horizontal passageway for the gas, at least one absorption medium positioned within the passageway, and means for distributing an absorption liquid on the absorption medium, the improvement wherein the absorption medium is a flat plate positioned at an angle of about 45° with respect to the horizontal gas stream, and having a plurality of slit-like apertures formed in the absorption medium arranged in a herringbone pattern.

* * * * *